United States Patent
Gocek et al.

(10) Patent No.: US 9,348,923 B2
(45) Date of Patent: May 24, 2016

(54) SOFTWARE ASSET MANAGEMENT USING A BROWSER PLUG-IN

(71) Applicant: International Business Machines Corporation, Armonk, NY (US)

(72) Inventors: Pawel Gocek, Cracow (PL); Piotr Kania, Cracow (PL); Michal Paluch, Cracow (PL); Tomasz Stopa, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 14/073,440

(22) Filed: Nov. 6, 2013

(65) Prior Publication Data

US 2014/0149585 A1    May 29, 2014

(30) Foreign Application Priority Data

Nov. 27, 2012   (GB) .................................. 1221293.2

(51) Int. Cl.
*G06F 17/30* (2006.01)
*G06F 9/445* (2006.01)

(52) U.S. Cl.
CPC ............ *G06F 17/30867* (2013.01); *G06F 8/60* (2013.01); *G06F 17/30887* (2013.01); *G06F 17/30318* (2013.01); *G06F 17/30864* (2013.01)

(58) Field of Classification Search
CPC ...................... H04L 43/0876; G06F 17/30867; G06F 17/30864; G06F 17/30318
See application file for complete search history.

(56) References Cited

U.S. PATENT DOCUMENTS

| | | | |
|---|---|---|---|
| 7,260,774 B2 * | 8/2007 | Lambert | G06F 17/3089 707/E17.119 |
| 7,519,902 B1 * | 4/2009 | Kraft | G06F 17/30864 715/234 |
| 7,523,191 B1 | 4/2009 | Thomas et al. | |
| 8,079,087 B1 | 12/2011 | Spies et al. | |
| 8,196,205 B2 * | 6/2012 | Gribble | G06F 21/53 713/168 |
| 8,200,555 B2 | 6/2012 | Auvenshine et al. | |

(Continued)

FOREIGN PATENT DOCUMENTS

| | | |
|---|---|---|
| EP | 1385097 A2 | 1/2004 |
| GB | 2412189 A | 9/2005 |
| GB | 2441350 A | 3/2008 |

OTHER PUBLICATIONS

Jun et al., "Agent-Based Resource Discovery," Proceedings of the 9th Heterogeneous Computing Workshop (HCW 2000), May 2000, pp. 43-52.

(Continued)

*Primary Examiner* — Jimmy H Tran
(74) *Attorney, Agent, or Firm* — Yee & Associates, P.C.; Gail Zarick (57) ABSTRACT

A software asset management method comprising storing URL data for each of a first plurality of software entities, obtaining, by means of a first browser plug-in, first data indicative of a URL from which a browser has obtained content, comparing, for at least one of the first plurality of software entities, the URL data of the respective software entity with the first data, and communicating the first data to a first computer other than a computer hosting the browser subject to a first condition that, for each of the first plurality of software entities, the comparing reveals that the first data does not match the URL data of the respective software entity.

15 Claims, 5 Drawing Sheets

(56) References Cited

U.S. PATENT DOCUMENTS

| | | | |
|---|---|---|---|
| 8,200,586 B2 | 6/2012 | Alam et al. | |
| 8,364,795 B2* | 1/2013 | Meyerzon | H04L 63/08 707/709 |
| 8,756,293 B2* | 6/2014 | Duggal | G06F 9/468 709/203 |
| 8,881,040 B2* | 11/2014 | Li | G06F 17/30672 715/703 |
| 9,043,913 B2* | 5/2015 | Gribble | G06F 21/53 726/24 |
| 2003/0093316 A1* | 5/2003 | Wirth, Jr. | G06Q 30/02 705/14.23 |
| 2006/0190561 A1* | 8/2006 | Conboy | G06F 17/30864 709/217 |
| 2007/0174915 A1* | 7/2007 | Gribble | G06F 21/53 726/24 |
| 2009/0113397 A1 | 4/2009 | Wright, Sr. | |
| 2009/0216747 A1* | 8/2009 | Li | G06Q 10/067 |
| 2009/0216860 A1* | 8/2009 | Li | G06Q 10/067 709/219 |
| 2011/0145218 A1* | 6/2011 | Meyerzon | H04L 63/08 707/709 |
| 2011/0173178 A1* | 7/2011 | Conboy | G06F 17/30864 707/709 |
| 2011/0173525 A1 | 7/2011 | Mukhopadhyay et al. | |
| 2012/0078875 A1* | 3/2012 | Price | G06F 17/30867 707/709 |
| 2012/0167231 A1 | 6/2012 | Garcia et al. | |
| 2012/0297311 A1* | 11/2012 | Duggal | G06F 9/468 715/740 |
| 2013/0238589 A1* | 9/2013 | Yarramreddy | G06F 17/3087 707/709 |
| 2015/0066684 A1* | 3/2015 | K. V | G06F 17/30589 705/26.7 |

OTHER PUBLICATIONS

Tie et al., "Mobile Agent-Based Computing Resource and Usage Monitoring at Large Scale Computer Centers," Proceedings of the ASME 2011 International Design Engineering Technical Conferences & Computers and Information in Engineering Conference, Aug. 2011, pp. 735-744.

\* cited by examiner

SOFTWARE ASSET MANAGEMENT USING A BROWSER PLUG-IN

This Application claims the benefit of priority to United Kingdom Patent Application Serial No. GB1221293.2, filed on Nov. 27, 2012, the contents of which are hereby incorporated by reference.

BACKGROUND

The present disclosure is an invention disclosure relating to a software asset management method, a software asset management system as well as a corresponding computer program product.

It is known to maintain a catalog of the software available to/used by a user of a computing device. Such a catalog may be used for determining when it is appropriate to update software installed on the computing device, for determining license fees that may be incurred by virtue of use of the software, etc.

The present disclosure expounds upon this background.

BRIEF SUMMARY

Loosely speaking, the present disclosure teaches a method for managing software assets, in particular for maintaining a catalog of software assets. The disclosed method provides a unique perspective onto software assets by monitoring software usage by means of a browser plug-in, thus allowing easy discovery of web-based software and its usage. Use of a browser plug-in as an agent for monitoring software usage also makes it simpler to ensure that the agent is operating with an up-to-date software catalog since browsers typically comprise plug-in update facilities that allow the plug-in to download the latest software catalog as it becomes available.

In one aspect, as touched upon supra, the present disclosure relates to a method, e.g. to a software asset management method.

The method may comprise storing URL data for each of a (first) plurality of software entities. The URL data may be representative of one or more Uniform Resource Locators (URL) for each of the (first) plurality of software entities. As such, the URL data may be representative of a location/realm, e.g. a location/realm in a (computer) network such as the Internet. Any (e.g. one, at least two or each) of the URLs may respectively comprise a domain name and/or an IP address. (An elucidation of the term "any" is given in the closing paragraphs of this specification.)

The method may comprise storing software entity identifying data that (uniquely) identifies any of the (first) plurality of software entities.

The URL data may be structured such that URL data for a respective software entity of the (first) plurality of software entities is associated with/linked to the software entity identifying data identifying the respective software entity. Similarly, software entity identifying data may be structured such that software entity identifying data identifying a respective software entity is associated with/linked to the URL data for the respective software entity. For example, the software entity identifying data and URL data for a respective software entity may be stored as a single record or as linked records of a database comprising the URL data and the software entity identifying data.

Any of the (first) plurality of software entities may be/comprise a software application, i.e. a quantity of code capable of self-contained execution on a computer, e.g. that can be executed without requiring code other than that provided by a (host) operating system. Such a quantity of code may be termed a freestanding application. Any of the (first) plurality of software entities may moreover be/comprise a collection of data, e.g. a database required for proper operation of a software application. The software entities may be uniquely identified by any of a name of the software entity, a part number of the software entity, a path name identifying a path to the respective software entity or to a folder in which the respective software entity is stored, a "signature" of the software entity, etc. Such a "signature" may be a number indicative of or derived/calculated from any of an installation time, a file size, etc. of the software entity.

The URL data and/or the software entity identifying data may constitute (part of) a software catalog. A software catalog may include a software inventory report, e.g. data specifying which software entities are installed on and/or accessed by a given computing entity, a given computing system, one or more given realms of a computing entity and/or one or more given realms of a computing system. Such a software inventory report may specify all software entities installed on/accessed by the given computing entity/system/realms or may be limited to software entities of one or more given types, e.g. software entities that are word processing applications, CAD applications or spreadsheet applications and/or that are databases required by such applications (e.g. a dictionary database or a database of basic CAD data (e.g. data representative of standard screws and bolts)). The computing entity may be, for example, a laptop computer, a personal computer or other single end-user computing device or a computing environment configured to be accessible only to a single user, e.g. a user account on a personal computer or a user account in a computer network, and may be understood as including one or more storage devices attached directly to such a laptop computer, personal computer, etc. One or more of the computing entities may be peers, e.g. computing entities that execute vastly identical tasks and/or that are equipped with vastly identical software. Similarly, one or more of the computing entities may be peers in the sense that they belong to a common network, i.e. share a common IP address as seen from the public Internet or belong to a common subnet of IP addresses. Similarly, one or more of the computing entities may be peers in the sense that they are property of a single business unit (of a single legal entity). The computing system may comprise a (networked) plurality of computing entities and/or one or more servers/server storage devices that provide computing and/or data storage services to any of the computing entities. Any of the computing entities may be peers in the sense that they are elements of a single computing system. The computing system may be operated by a single legal entity, e.g. a corporation, institute, government agency, etc. The computing system may be accessible solely to employees/members of the legal entity. The computing system may furthermore be accessible to third parties, i.e. to persons that are not employees/members of the legal entity. The legal entity, as the operator of the computing system, may bear the legal responsibility for purchase/licensing of some or all software installed within and/or accessed from within the computing system. The boundary of the computing system may be defined by one or more boundaries where legal responsibility for purchase/licensing of some or all software installed within and/or accessed from within the computing system would shift to another legal entity. The boundary of the computing system may be the property boundaries of the legal entity's place(s) of business. The property boundaries may be understood as encompassing mobile devices used by employees/members of the legal entity at a location remote from the legal entity's premises. In the case of outsourced services, for example, a contract between the legal entity and a service provider may stipulate that legal responsibility for purchase/licensing of some or all software installed within and/or accessed from within the computing system may be incumbent upon the legal entity, although part or all of the computing system is operated by one or more service providers not necessarily affiliated with the legal entity. In the present disclosure, the term "administrator" may be understood as a person who is knowledgeable of what software entities are (licensed to be) installed within/accessible from within the computing system/the respective computing entities, a person who has privileges to install executable software entities within the computing system/the respective computing entities and/or a person who has privileges to govern the privileges of users of the computing system/the respective computing entities to access software entities from within the computing system/the respective computing entities.

The method may comprise obtaining (first) data representative of a location from which a browser has obtained content. The content may be HTML content. Similarly, the content may be or comprise data that conforms to the HTML 2.0 standard or to any other HTML standard adopted by the World Wide Web Consortium. The browser may be/comprise computer executable code (e.g. a freestanding application). In particular, the browser may be/comprise computer executable code capable of rendering HTML content as an interactive document, e.g. as a graphic document with which a user can interact via computer hardware hosting the browser. In the present disclosure, the term "computer hosting the browser" may be understood as designating computer hardware that executes instructions of executable code constituting the browser. The (first) data may represent the location by specifying a realm from which the browser has obtained content. As such, the "location" may be a realm, even when not explicitly designated as such hereinbelow. The location may be a location in a (computer) network such as the Internet. For example, the location may be a server from which the browser obtained HTML content. The (first) data may represent the location as a URL, e.g. as a URL comprising a domain name and/or an IP address. The (first) data may be obtained by means of a (first) browser plug-in, e.g. via a browser plug-in installed in the browser. In the present disclosure, the term "plug-in" may be understood as computer executable code that complements the functionality of a freestanding application, e.g. of the browser. For example, the freestanding application may allow for installation of one or more plug-ins that respectively extends the functionality of the freestanding application. The freestanding application may allow any of the plug-ins to access one or more (internal) variables/parameters of the freestanding application. Similarly, any of the plug-ins may allow the freestanding application to access one or more (internal) variables/parameters of the respective plug-in. Furthermore, a graphical user interface of the freestanding application may be designed to accommodate a respective graphical user interface of any of the plug-ins. As such, boundaries between the graphical user interface of the freestanding application and the graphical user interface of the plug-ins may be (substantially) invisible to a user.

The method may comprise comparing the (first) data with any of the URL data. For example, the method may comprise comparing, for any of the (first) plurality of software entities, the URL data of the respective software entity with the (first) data. The comparing may comprise determining whether the URL data is identical/matches/corresponds to the (first) data. For example, the comparing may comprise determining whether a domain name and/or an IP address comprised by the URL data of the respective software entity is identical/matches/corresponds to the domain name and/or an IP address comprised by the (first) data. Similarly, the comparing may comprise determining whether a location/realm represented by the (first) data belongs to/falls within a location/realm represented by the URL data of the respective software entity.

The method may comprise communicating the (first) data to a (first) computing environment. For example, the method may comprise communicating the (first) data to a (first) computing environment accessible only to a first set of users/administrators from a (second) computing environment accessible only to a second set of users/administrators that differs (with respect to at least one user/administrator) from the first set. The (first) computing environment may be a computing environment other than a computing environment hosting the browser. The (first) computing environment/the computing environment hosting the browser may be a virtual computing environment, a non-virtual computing environment or a mixture of virtual and non-virtual computing environments. In the present disclosure, the term "virtual computing environment" may be understood as a software system that emulates computing environment including hardware. As such, the (first) computing environment/the computing environment hosting the browser may comprise software and/or hardware. For example, the method may comprise communicating the (first) data from a (end-user/client) computer hosting the browser to another computer, e.g. to a server. Similarly, the method may comprise communicating the (first) data from a virtual computing environment executing on a computer to another (virtual/non-virtual) computing environment executing on that same computer. For example, the method may comprise communicating the (first) data from a virtual computing environment configured to be accessible only to a single user (e.g. a user account executing on a server remote from a user display terminal) to a software entity cataloging application executing in a different computing environment executed on the same computer hardware as (a virtual machine supporting) the virtual computing environment.

The communicating (of the (first) data) may be subject to a (first) condition. In other words, the method may be such that the communicating occurs if and only if the (first) condition is fulfilled. For example, the communicating may be subject to the (first) condition that, for any of the (first) plurality of software entities, the comparing reveals (i.e. determines/yields a result indicating) that the (first) data does not match the URL data of the respective software entity.

The method may comprise storing authorization data, e.g. for any of a (second) plurality of software entities. The authorization data may specify, e.g. for any of the (second) plurality of software entities, i.e. for one or more respective sets of software entities (respectively comprising one, at least two or each of the (second) plurality of software entities), one or more users authorized to use/access the respective set of software entities. The second plurality of software entities may comprise any of the first plurality of software entities.

The method may comprise determining whether a user, e.g. a user of the browser, is authorized to use a software entity, e.g. a software entity belonging to the (first and/or second) plurality of software entities. The software entity may be a software entity accessed by the browser, e.g. a software entity with which the user interacts via the browser (such a software entity is often termed a "web application"). The determining may be effected using (any portion of) the authorization data and/or using a result of the (aforementioned) comparing (of the (first) data with any of the URL data). For example, the method may comprise identifying a software entity accessed by the browser, e.g. using a result of the comparing, e.g. by determining whether the comparing reveals a match between the (first) data and a portion of the URL data for a particular software entity. The method may furthermore comprise determining whether (any portion of) the authorization data, e.g. authorization data for the software entity identified as being accessed by the browser, specifies that the user (in question) is authorized to use the software entity identified as being accessed by the browser.

The obtaining (of (first) data) and/or the comparing (of the (first) data with any of the URL data) may be recurringly reiterated. For example, the obtaining and/or the comparing may be carried out at a given/user-specified interval, e.g. at least once every five minutes, at least once every 15 minutes, at least once per hour or at least once per day. The obtaining may be carried out more frequently than the comparing, e.g. at least 10, 20 or one hundred times more frequently. For example, the method may comprise carrying out the obtaining at least once every five minutes or at least once every 10 minutes and carrying out the comparing less often than once per hour, less often than once per day or less often than once per week.

The obtaining of (first) data may be effected for any (open) tab and/or window of the browser. As such, the method may comprise respectively obtaining (such) (first) data for each tab of each window of the browser. The (first) data for a respective tab/window may be representative of a location from which the browser has obtained content rendered in the respective tab/window. Any of the actions described above as being carried out with respect to the (first) data may be carried out with respect to any (such) respectively obtained (first) data, i.e. with respect to (first) data obtained for a respective tab/window. Similarly, any of the actions described above as being carried out with respect to a (derivative) result of an action carried out with respect to the (first) data may be carried out with respect to a corresponding (derivative) result of an action carried out with respect to any (such) respectively obtained (first) data, i.e. with respect to (first) data obtained for a respective tab/window. For example, the method may comprise comparing any (such) respectively obtained (first) data with any of the URL data. The method may comprise comparing, for at least one of the (first) plurality of software entities and for each obtained (first) data (i.e. for the respective (first) data of each tab/window existing when the obtaining was effected), the URL data of the respective software entity with the respectively obtained (first) data.

The method may comprise storing content data, e.g. for any of a (third) plurality of software entities. The content data may comprise (HTML) data representative of (a portion of) a (graphical) user interface of a software entity, e.g. an application. The application may be an application executing on a computer/in a computing environment that differs from the computer/computing environment hosting the browser. The content data may be or comprise HTML data. Similarly, the content data may be or comprise data that conforms to the HTML 2.0 standard or to any other HTML standard adopted by the World Wide Web Consortium. The content data may comprise (HTML) data stored at a URL/location represented by said URL data. For example, the content data for a respective software entity may comprise (HTML) data stored at a URL/location represented by said URL data for the respective software entity. The third plurality of software entities may comprise any of the first plurality of software entities and/or any of the second plurality of software entities.

The method may comprise obtaining (second) data representative of (at least a portion of) the content obtained by the browser, e.g. content from the location that the (first) data is representative of. The (second) data may be obtained by means of the (first) browser plug-in. The (second) data may be obtained together/in conjunction with (first) data. As touched upon above, the content may be HTML content. Similarly, the content may be or comprise data that conforms to the HTML 2.0 standard or to any other HTML standard adopted by the World Wide Web Consortium. The obtaining of (second) data may be effected for any (open) tab/window of the browser. As such, the method may comprise respectively obtaining (such) (second) data for each tab of each window of the browser. The (second) data obtained for a respective tab/window of the browser may be representative of (at least a portion of) the content rendered (by the browser) in the respective tab/window.

The method may comprise comparing the (second) data with any of the content data. For example, the method may comprise comparing, for any of the (third) plurality of software entities, the content data of the respective software entity with the (second) data. The comparing may comprise determining whether (a portion of) the content data is identical/matches/corresponds to (a portion of) the (second) data.

As touched upon above, the method may comprise determining whether a user, e.g. a user of the browser, is authorized to use a software entity. The determining may be effected using (any portion of) the authorization data and/or using a result of the (aforementioned) comparing (of the (second) data with any of the content data). As such, the determining may be effected using (any portion of) the authorization data, a result of the comparing of the (second) data with any of the content data and/or a result of the comparing of the (first) data with any of the URL data. For example, the method may comprise identifying a software entity accessed by the browser, e.g. using a result of the comparing of the (second) data with any of the content data, e.g. by determining whether the comparing reveals a match between (a portion of) the (second) data and (a portion of) the content data for a particular software entity. The method may furthermore comprise determining whether (any portion of) the authorization data, e.g. authorization data for the software entity identified as being accessed by the browser, specifies that the user (in question) is authorized to use the software entity identified as being accessed by the browser.

The method may comprise communicating the (second) data to the (first) computing environment. The second data may be communicated to the (first) computing environment together with the first data, e.g. together with the first data obtained together/in conjunction with (second) data.

The communicating (of the (first/second) data) may be subject to a (second) condition. In other words, the method may be such that the communicating occurs if and only if the (second) condition is fulfilled. For example, the communicating may be subject to the (second) condition that, for any of the (third) plurality of software entities, the comparing (of the content data with the (second) data) reveals (i.e. determines/yields a result indicating) that the (second) data does not match the content data of the respective software entity, e.g. that no portion of the (second) data is identical/matches/corresponds to (any portion of) the content data of the respective software entity.

As such, the communicating may be subject to the first and second condition. In other words, the method may be such that the communicating occurs if and only if both the first condition and the second condition are fulfilled.

Any of the aforementioned actions, e.g. any of the aforementioned actions of storing, obtaining, comparing, communicating and/or determining may be effected by a browser plug-in, e.g. by the (first) browser plug-in. Any of the data, e.g. any of the URL data, the software entity identifying data, the authorization data and/or the content data may be stored in the (first) browser plug-in. For example, the data constituting the (first) browser plug-in may comprise computer executable code (for effecting the functionality of the plug-in) and any of the URL data, the software entity identifying data, the authorization data and/or the content data.

The method may comprise determining a software entity associated with the communicated (first/second) data. For example, the method may comprise determining a software entity (uniquely) identified by the communicated (first/second) data. The method may comprise retrieving additional data from a location represented by the communicated first data. The additional data may be used to determine the software entity. The method may comprise displaying any of the communicated (first/second) data and/or the additional data to a user/administrator. Similarly, the method may comprise receiving an input from a user/administrator specifying a software entity (uniquely) identified by the communicated (first/second) data. Any of the determining, retrieving, displaying and/or receiving may be effected in/by the (first) computing environment.

The method may comprise communicating the communicated first data to a plurality of computing environments other than the (aforementioned) first computing environment as URL data for the software entity (determined to be associated with the communicated (first/second) data). Similarly, the method may comprise creating, e.g. in/by the (first) computing environment, a (second) browser plug-in comprising the communicated first data as URL data for the software entity (determined to be associated with the communicated (first/second) data). The method may comprise installing the (second) browser plug-in into the browser.

The method may comprise storing a time at which the (first/second) data is obtained.

The communicating (of the (first/second) data) may be subject to a (third) condition. In other words, the method may be such that the communicating occurs if and only if the (third) condition is fulfilled. For example, the communicating may be subject to the (third) condition that, for any of the (first) plurality of software entities, the comparisons (i.e. the aforementioned (recurring) actions of "comparing" the URL data with the (first) data) using (first) data obtained during a period of time reveal (i.e. determines/yields a result indicating) that the (first) data (obtained during the period of time) does not match the URL data of the respective software entity.

The communicating (of the (first/second) data) may be subject to a (fourth) condition. In other words, the method may be such that the communicating occurs if and only if the (fourth) condition is fulfilled. For example, the communicating may be subject to the (fourth) condition that, for any of the (third) plurality of software entities, the comparisons (i.e. the aforementioned (recurring) actions of "comparing" the content data with the (second) data) using (second) data obtained during a period of time reveal (i.e. determines/yields a result indicating) that the (second) data (obtained during the period of time) does not match the content data of the respective software entity, e.g. that no portion of the (second) data is identical/matches/corresponds to (any portion of) the content data of the respective software entity.

The stored times may be used to determine whether the (first/second) data used for the comparisons was obtained during the period of time. The period of time may be on the order of hours, days or weeks. The period of time may be specified by data in the browser plug-in. Similarly the period of time may be specified by data received from a user/administrator.

The method may comprise storing (exclusionary) URL data for each of a plurality of websites. The (exclusionary) URL data may be representative of one or more locations/realms, e.g. locations/realms in a (computer) network such as the Internet. The (exclusionary) URL data may comprise one or more domain names and/or IP addresses, e.g. of commonly accessed websites such as www.google.com or www.amazon.com. The communicating (of the (first/second) data) may be subject to a (fifth) condition. In other words, the method may be such that the communicating occurs if and only if the (fifth) condition is fulfilled. For example, the communicating may be subject to the (fifth) condition that the (first) data (obtained together/in conjunction with the (second) data) does not match any (portion) of the (exclusionary) URL data.

As such, the communicating may be subject to the third, fourth and fifth condition. In other words, the method may be such that the communicating occurs if and only if the third, fourth and fifth conditions are fulfilled.

While the teachings of the present disclosure have been discussed hereinabove mainly in the form of a method, the teachings may be embodied, mutatis mutandis, in the form of a system, e.g. a software asset management system, or a computer program product, as will be appreciated by the person skilled in the art.

The system may be configured and adapted to effect any of the actions described above with respect to the disclosed method. For example, the system may comprise a controller that effects any of the actions described above with respect to the disclosed method.

The system may comprise a (first) browser plug-in.

The system may comprise a data storage for storing data, e.g. URL data, software entity identification data, authorization data and/or content data, as discussed hereinabove. The data storage may be an element of the (first) browser plug-in. In other words, the (first) browser plug-in may comprise the data storage.

The system may comprise a data obtainer for obtaining data, e.g. first/second data, as discussed hereinabove. The data obtainer may be an element of the (first) browser plug-in. In other words, the (first) browser plug-in may comprise the data obtainer.

The system may comprise a data comparer for comparing data as discussed hereinabove. The data comparer may be an element of the (first) browser plug-in. In other words, the (first) browser plug-in may comprise the data comparer.

The system may comprise at least one data communicator for communicating data as discussed hereinabove. The data communicator may be an element of the (first) browser plug-in. In other words, the (first) browser plug-in may comprise the data communicator.

The system may comprise an authorization determiner that determines whether a user is authorized to use a software entity as described hereinabove. The authorization determiner may be an element of the (first) browser plug-in. In other words, the (first) browser plug-in may comprise the authorization determiner.

The system may comprise a software entity determiner that determines a software entity associated with (given) data as described hereinabove.

The system may comprise a browser plug-in creator for creating a (second) browser plug-in as described hereinabove.

The system may comprise a plug-in installer that installs a (second) browser plug-in as described hereinabove.

The system may comprise a user input device that receives user inputs as discussed hereinabove.

Any of the aforementioned elements of the system may communicate with any other of the aforementioned elements of the system. In this respect, the system may comprise one or more communication busses/links interconnecting the respective elements.

DETAILED DESCRIPTION

Figure 1:
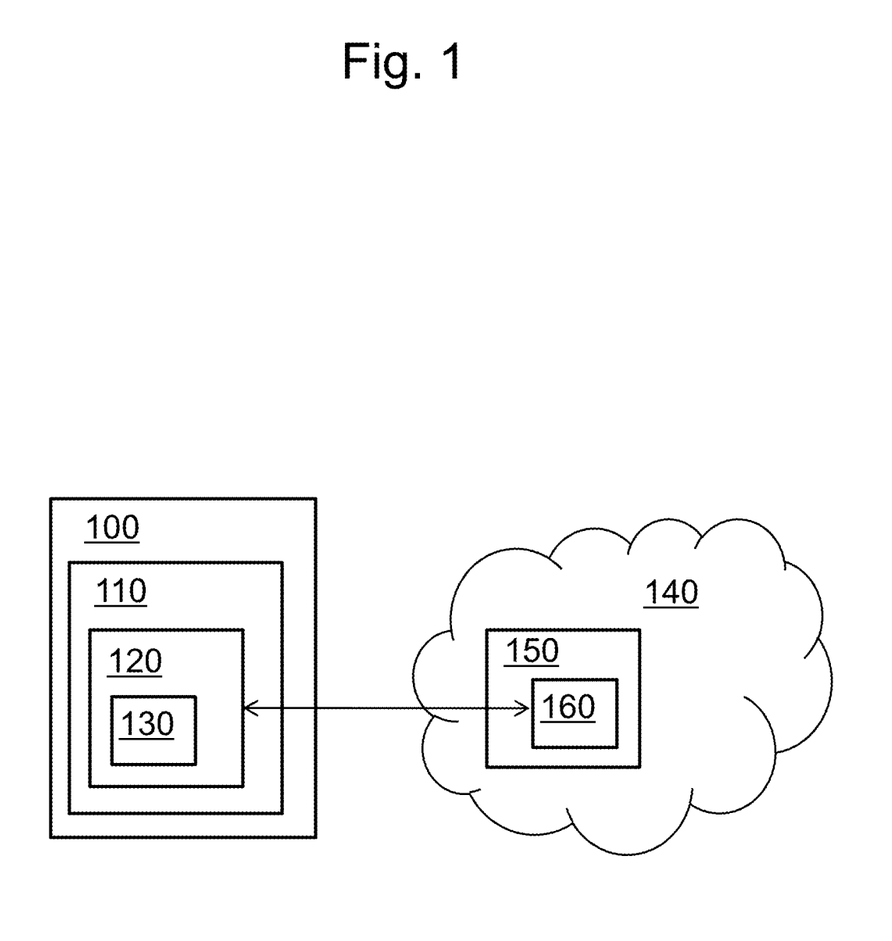
FIG. 1 schematically shows an embodiment of a software asset management system in accordance with the present disclosure.

FIG. 1 schematically shows an embodiment of a software asset management system in accordance with the present disclosure, e.g. as described above.

FIG. 1 schematically shows a computer 100 that hosts a virtual computing environment 110 that hosts a browser 120 that comprises a browser plug-in 130 that, in the illustrated embodiment, acts as a software asset management system. Browser 120 transmits data to and receives data from a website 160 that hosts a software entity, e.g. a web application. Website 160 is hosted by a (server) computer 150 in a network 140 such as the Internet. In an alternative embodiment, website 160 may be hosted by a virtual computing environment hosted by computer 100 that differs from virtual computing environment 110. For example, computer 100 may be a server that hosts a plurality of virtual computing environments for a respective plurality of users and that hosts a virtual computing environment that hosts website 160 including a web application used by the plurality of users.

Figure 2:
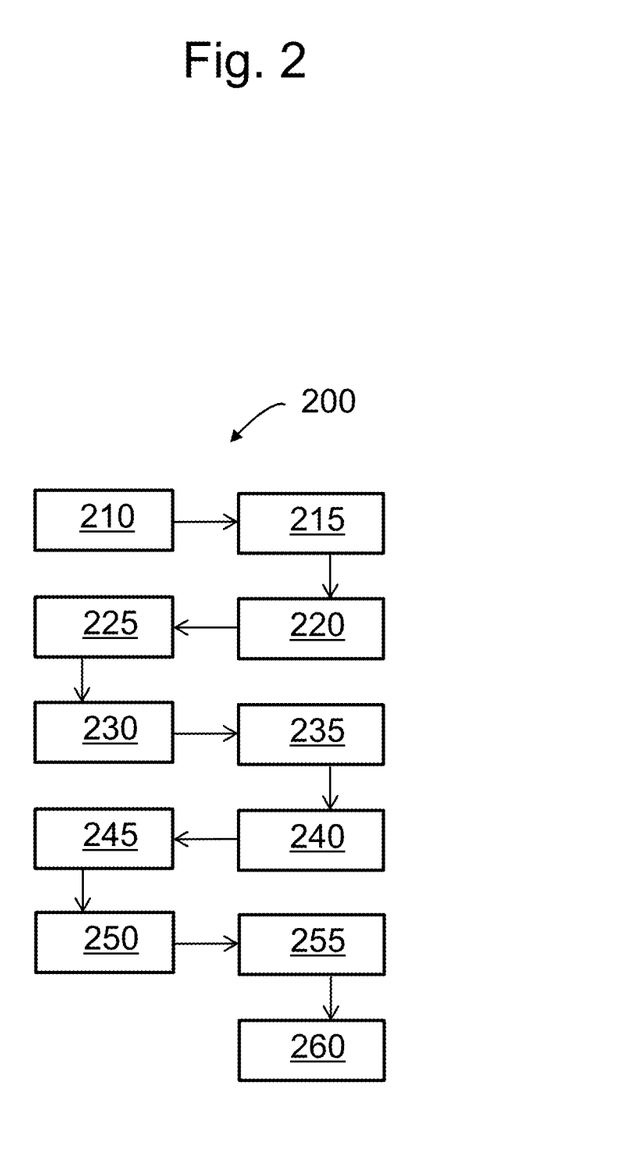
FIG. 2 schematically shows a flow diagram of an embodiment of a software asset management method in accordance with the present disclosure.

FIG. 2 schematically shows a flow diagram of an embodiment of a software asset management method 200 in accordance with the present disclosure, e.g. as described above.

In the illustrated embodiment, software asset management method 200 comprises a step 210 of storing URL data, a step 215 of obtaining first data representative of a location from which a browser has obtained content, a step 220 of comparing the URL data with the first data, a step 225 of communicating the first data to a first computing environment, an optional step 230 of storing authorization data, an optional step 235 of determining whether a user is authorized to use a software entity, an optional step 240 of storing content data, an optional step 245 of obtaining second data representative of a portion of content, an optional step 250 of comparing the content data with the second data, an optional step 255 of determining a software entity associated with the communicated first data and an optional step 260 of communicating the communicated first data to a plurality of computing environments.

Figure 3:
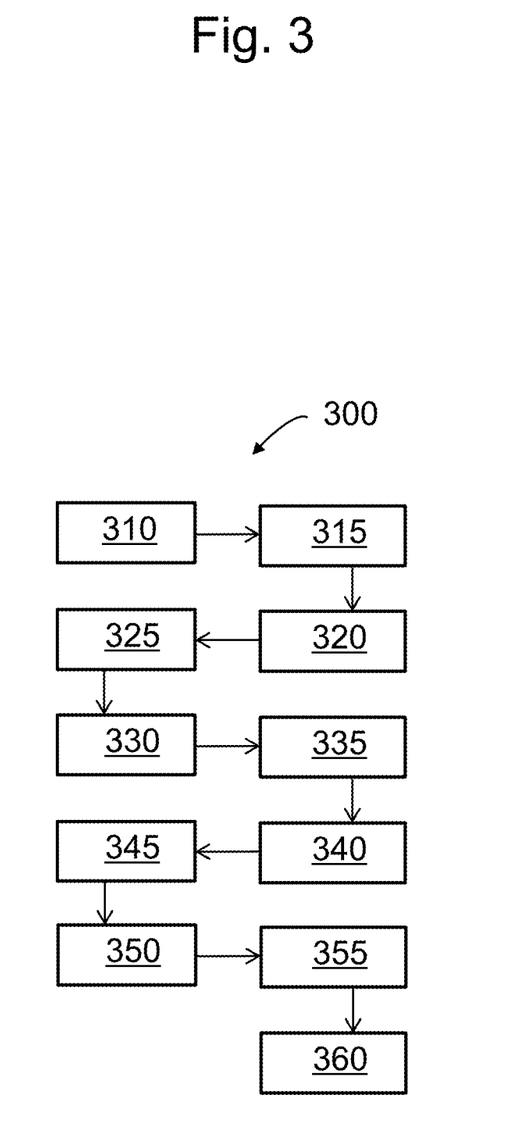
FIG. 3 schematically shows a flow diagram of another embodiment of a software asset management method in accordance with the present disclosure.

FIG. 3 schematically shows a flow diagram of another embodiment of a software asset management method 300 in accordance with the present disclosure, e.g. as described above.

In the illustrated embodiment, software asset management method 300 comprises a step 310 of storing URL data, a step 315 of obtaining first data representative of a location from which a browser has obtained content, a step 320 of comparing the URL data with the first data, a step 325 of communicating the first data to a first computing environment, an optional step 330 of storing authorization data, an optional step 335 of determining whether a user is authorized to use a software entity, an optional step 340 of storing content data, an optional step 345 of obtaining second data representative of a portion of the content, an optional step 350 of comparing the content data with the second data, an optional step 355 of determining a software entity associated with the communicated first data and an optional step 360 of creating a browser plug-in comprising the communicated first data as URL data.

Figure 4:
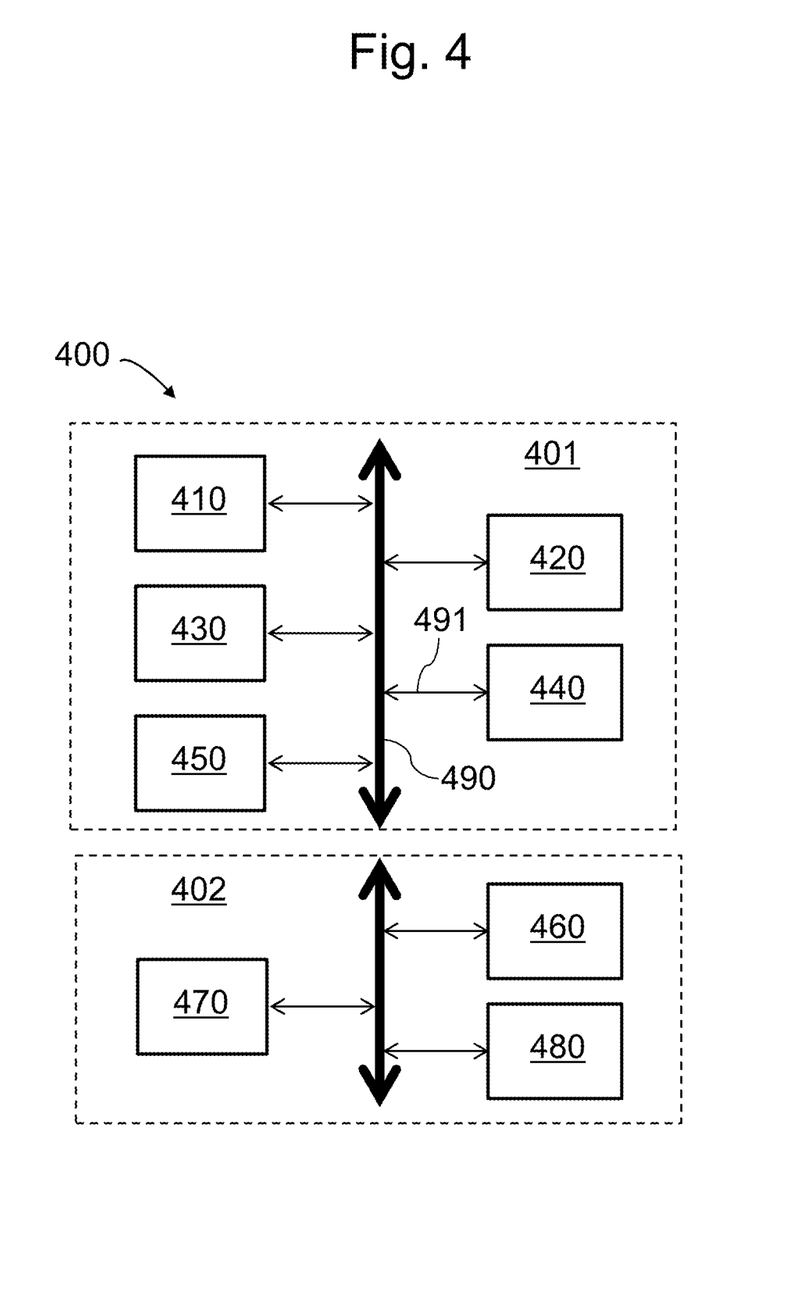
FIG. 4 schematically shows another embodiment of a software asset management system in accordance with the present disclosure.

FIG. 4 schematically shows another embodiment of a software asset management system 400 in accordance with the present disclosure, e.g. as described above.

In the illustrated embodiment, software asset management system 400 comprises a data storage 410 that stores URL data, a data obtainer 420 that obtains first data representative of a location from which a browser, e.g. browser 120, has obtained content, a data comparer 430 that compares the URL data with the first data, a first data communicator 440 that communicates the first data to a first computing environment, e.g. computer 150, an optional authorization determiner 450 that determines whether a user is authorized to use a software entity, an optional software entity determiner 460 that determines a software entity associated with the communicated first data, an optional second data communicator 470 that communicates the communicated first data to a plurality of computing environments, an optional user input device 480 and a communication bus 490 comprising a plurality of communication links 491 (for the sake of legibility, only one communication bus and only one communication links bears a reference sign). Communication bus 490 and the communication links 491 communicatively interconnect data storage 410, data obtainer 420, data comparer 430, first data communicator 440 and authorization determiner 450. Similarly, another communication bus and communication links communicatively interconnect software entity determiner 460, second data communicator 470 and user input device 480.

In the illustrated embodiment, software asset management system 400 furthermore comprises a browser plug-in 401 and a software catalog system 402. Browser plug-in 401 and software catalog system 402 belong to/execute in different computing environments, e.g. different computers, that may communicate data via a network. Browser plug-in 401 comprises data storage 410, data obtainer 420, data comparer 430, first data communicator 440 and authorization determiner 450, whereas software catalog system 402 comprises software entity determiner 460, second data communicator 470 and user input device 480.

Figure 5:
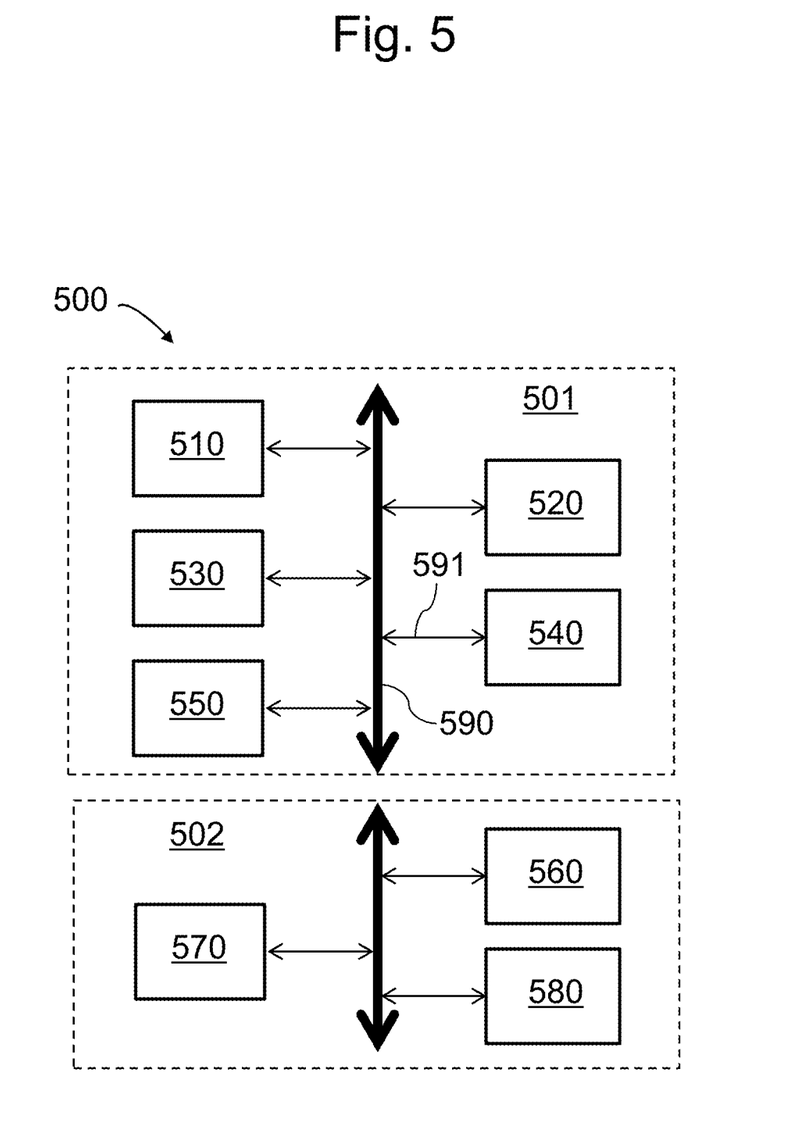
FIG. 5 schematically shows another embodiment of a software asset management system in accordance with the present disclosure.

FIG. 5 schematically shows another embodiment of a software asset management system 500 in accordance with the present disclosure, e.g. as described above.

In the illustrated embodiment, software asset management system 500 comprises a data storage 510 that stores URL data, a data obtainer 520 that obtains first data representative of a location from which a browser, e.g. browser 120, has obtained content, a data comparer 530 that compares the URL data with the first data, a first data communicator 540 that communicates the first data to a first computing environment, e.g. computer 150, an optional authorization determiner 550 that determines whether a user is authorized to use a software entity, an optional software entity determiner 560 that determines a software entity associated with the communicated first data, an optional browser plug-in creator 570 that creates a browser plug-in comprising the communicated first data as URL data, an optional user input device 580 and a communication bus 590 comprising a plurality of communication links 591 (for the sake of legibility, only one communication bus and only one communication links bears a reference sign). Communication bus 590 and the communication links 591 communicatively interconnect data storage 510, data obtainer 520, data comparer 530, first data communicator 540 and authorization determiner 550. Similarly, another communication bus and communication links communicatively interconnect software entity determiner 560, browser plug-in creator 570 and user input device 580.

In the illustrated embodiment, software asset management system 500 furthermore comprises a browser plug-in 501 and a software catalog system 502. Browser plug-in 501 and software catalog system 502 belong to/execute in different computing environments, e.g. different computers, that may communicate data via a network. Browser plug-in 501 comprises data storage 510, data obtainer 520, data comparer 530, first data communicator 540 and authorization determiner 550, whereas software catalog system 502 comprises software entity determiner 560, browser plug-in creator 570 and user input device 580.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In the present disclosure, the verb "may" is used to designate optionality/noncompulsoriness. In other words, something that "may" can, but need not.

In the present disclosure, the term "any" may be understood as designating any number of the respective elements, i.e. as designating one, at least one, at least two, each or all of the respective elements. Similarly, the term "any" may be understood as designating any collection(s) of the respective elements, i.e. as designating one or more collections of the respective elements, a collection comprising one, at least one, at least two, each or all of the respective elements. The respective collections need not comprise the same number of elements.

In the present disclosure, expressions in parentheses may be understood as being optional. As used in the present disclosure, quotation marks may emphasize that the expression in quotation marks may also be understood in a figurative sense. As used in the present disclosure, quotation marks may identify a particular expression under discussion.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A software asset management method comprising:
   storing uniform resource locator (URL) data for each of a first plurality of software entities;
   obtaining, by means of a first browser plug-in, first data representative of a location from which a browser has obtained content;
   comparing, for at least one of said first plurality of software entities, said URL data of the respective software entity with said first data; and
   communicating said first data to a first computing environment other than a computing environment hosting said browser subject to a first condition that, for each of said first plurality of software entities, said comparing reveals that said first data does not match said URL data of the respective software entity.

2. The method of claim 1, further comprising:
   storing authorization data for each of a second plurality of software entities, said second plurality of software entities comprising at least one of said first plurality of software entities; and
   determining, using said authorization data and a result of said comparing, whether a user of said browser is authorized to use a software entity accessed by said browser.

3. The method of claim 1, wherein said obtaining and said comparing are recurringly reiterated.

4. The method of claim 1, wherein:
   said obtaining is effected for each tab of each window of said browser; and
   for each said obtaining, said comparing is effected with said first data of the respective obtaining.

5. The method of claim 1, further comprising:
   storing content data for each of a third plurality of software entities belonging to said first plurality of software entities;
   obtaining, by means of said first browser plug-in, second data representative of at least a portion of said content; and
   comparing, for at least one of said third plurality of software entities, said content data of the respective software entity with said second data, wherein
      said communicating is subject to said first condition and a second condition that, for each of said third plurality of software entities, said comparing content data reveals that said second data does not match said content data of the respective software entity, and
      said communicating comprises communicating said second data to said first computing environment.

6. The method of claim 1, further comprising:
   determining a software entity associated with said communicated first data; and
   communicating said communicated first data to a plurality of computing environments other than said first computing environment as URL data for said determined software entity.

7. The method of claim 1, further comprising:
   determining a software entity associated with said communicated first data; and
   creating a second browser plug-in comprising said communicated first data as URL data for said determined software entity.

8. A software asset management system, comprising:
   a data storage hardware system that stores uniform resource locator (URL) data for each of a first plurality of software entities;
   a data obtainer that obtains, by means of a first browser plug-in of a hardware computing entity, first data representative of a location from which a browser has obtained content;
   a data comparer that compares, for at least one of said first plurality of software entities, said URL data of the respective software entity with said first data; and
   a first data communicator that communicates via a network said first data to a first computing environment other than a computing environment hosting said browser subject to a first condition that, for each of said first plurality of software entities, said comparing reveals that said first data does not match said URL data of the respective software entity.

9. The system of claim 8, further comprising:
   an authorization determiner, wherein said data storage hardware system stores authorization data for each of a second plurality of software entities, said second plurality of software entities comprising at least one of said first plurality of software entities; and said authorization determiner determines, using said authorization data and a result of said comparing, whether a user of said browser is authorized to use a software entity accessed by said browser.

10. The system of claim 8, wherein said data obtainer recurringly reiterates said obtaining and said data comparer recurringly reiterates said comparing.

11. The system of claim 8, wherein:

said data obtainer effects said obtaining for each tab of each window of said browser; and for each said obtaining, said data comparer effects said comparing with said first data of the respective obtaining.

12. The system of claim 8, wherein:

said data storage hardware system stores content data for each of a third plurality of software entities belonging to said first plurality of software entities;

said data obtainer obtains, by means of said first browser plug-in, second data representative of at least a portion of said content;

said data comparer compares, for at least one of said third plurality of software entities, said content data of the respective software entity with said second data;

said first data communicator communicates via the network said second data to said first computing environment; and said communicating of said first and second data is subject to said first condition and a second condition that, for each of said third plurality of software entities, said comparing content data reveals that said second data does not match said content data of the respective software entity.

13. The system of claim 8, further comprising:

a software entity determiner that determines a software entity associated with said communicated first data; and a second data communicator that communicates said communicated first data to a plurality of computing environments other than said first computing environment as URL data for said determined software entity.

14. The system of claim 8, further comprising:

a software entity determiner that determines a software entity associated with said communicated first data; and a browser plug-in creator that creates a second browser plug-in comprising said communicated first data as URL data for said determined software entity.

15. A computer program product comprising program code stored on a non-transitory computer usable storage medium, said program code being configured to cause a computer to perform a method according to claim 1 when said program code is run on said computer.

* * * * *